(12) United States Patent
Gerlier

(10) Patent No.: US 11,064,791 B2
(45) Date of Patent: Jul. 20, 2021

(54) SYSTEM FOR CREATING AND PROVIDING A PRODUCT OF A CERTAIN COLOR OR TEXTURE CHOSEN BY A SUBJECT AND PRODUCT PRODUCED BY SUCH A SYSTEM

(71) Applicant: La Bouche Rouge, Paris (FR)

(72) Inventor: Nicolas Gerlier, Neuilly sur Seine (FR)

(73) Assignee: LA BOUCHE ROUGE, Paris (FR)

( * ) Notice: Subject to any disclaimer, the term of this patent is extended or adjusted under 35 U.S.C. 154(b) by 0 days.

(21) Appl. No.: 16/341,961

(22) PCT Filed: Oct. 12, 2016

(86) PCT No.: PCT/FR2016/052637
§ 371 (c)(1),
(2) Date: Apr. 15, 2019

(87) PCT Pub. No.: WO2018/069581
PCT Pub. Date: Apr. 19, 2018

(65) Prior Publication Data
US 2019/0239623 A1      Aug. 8, 2019

(51) Int. Cl.
| | | |
|---|---|---|
| *A45D 44/00* | (2006.01) | |
| *G01J 3/46* | (2006.01) | |
| *G01J 3/52* | (2006.01) | |
| *G05B 15/02* | (2006.01) | |
| *G06Q 30/06* | (2012.01) | |
| *G06Q 50/04* | (2012.01) | |

(52) U.S. Cl.
CPC ............ *A45D 44/005* (2013.01); *G01J 3/463* (2013.01); *G01J 3/52* (2013.01); *G01J 3/526* (2013.01); *G05B 15/02* (2013.01); *G06Q 30/0621* (2013.01); *G06Q 50/04* (2013.01); *A45D 2044/007* (2013.01)

(58) Field of Classification Search
None
See application file for complete search history.

(56) References Cited

U.S. PATENT DOCUMENTS

| | | | | |
|---|---|---|---|---|
| 5,785,960 | A * | 7/1998 | Rigg | A45D 44/005 424/63 |
| 7,522,769 | B2 * | 4/2009 | Harville | G06K 9/00234 382/162 |
| 8,693,768 | B1 * | 4/2014 | LaForgia | A45D 44/005 222/1 |
| 9,563,342 | B2 * | 2/2017 | Reynolds | G06F 3/0481 |

(Continued)

OTHER PUBLICATIONS

International Search Report dated Jun. 23, 2017 (5 pages including English translation) from PCT Priority Application No. PCT/FR2016/052637.

(Continued)

*Primary Examiner* — Ryan M Gray
(74) *Attorney, Agent, or Firm* — Barnes & Thornburg LLP; G. Peter Nichols

(57) ABSTRACT

A system for providing a product, such as a lipstick, the color of which is chosen by a subject. The system includes a viewing device for showing a subject or an object for which the color is chosen, a color palette from which the subject can choose a color, and a link to a production center for creating the product according to the choice of the subject. The system also includes a color-modifying device for modifying the color chosen by the subject.

10 Claims, 2 Drawing Sheets

(56) References Cited

U.S. PATENT DOCUMENTS

| | | | | |
|---|---|---|---|---|
| 2002/0082745 A1* | 6/2002 | Wilmott | A61K 8/9789 | 700/233 |
| 2003/0007684 A1* | 1/2003 | Kato | A45D 44/005 | 382/165 |
| 2003/0065578 A1* | 4/2003 | Peyrelevade | A45D 44/005 | 705/14.54 |
| 2003/0065636 A1* | 4/2003 | Peyrelevade | A61B 5/445 | 706/62 |
| 2004/0239689 A1* | 12/2004 | Fertig | A45D 44/005 | 345/641 |
| 2006/0283521 A1* | 12/2006 | Bartholomew | A45D 44/005 | 141/104 |
| 2007/0058860 A1* | 3/2007 | Harville | G06K 9/00234 | 382/167 |
| 2007/0071314 A1* | 3/2007 | Bhatti | G01J 3/524 | 382/162 |
| 2013/0300761 A1* | 11/2013 | Ahmed | G09G 5/02 | 345/595 |
| 2014/0006204 A1* | 1/2014 | Candrian | G06Q 30/0603 | 705/26.5 |
| 2014/0081463 A1* | 3/2014 | Igarashi | B01F 13/1063 | 700/265 |
| 2015/0021356 A1* | 1/2015 | Witchell | F04B 43/12 | 222/23 |
| 2016/0125624 A1 | 5/2016 | Liu et al. | | |
| 2017/0151538 A1* | 6/2017 | Balooch | B01F 5/0405 | |
| 2017/0178220 A1* | 6/2017 | Chong | G06K 9/00268 | |
| 2017/0208922 A1* | 7/2017 | Watson | A45D 44/005 | |
| 2017/0228892 A1* | 8/2017 | Nichol | G06T 7/90 | |

OTHER PUBLICATIONS

Written Opinion dated Jun. 23, 2017 from PCT Priority Application No. PCT/FR2016/052637.

* cited by examiner

SYSTEM FOR CREATING AND PROVIDING A PRODUCT OF A CERTAIN COLOR OR TEXTURE CHOSEN BY A SUBJECT AND PRODUCT PRODUCED BY SUCH A SYSTEM

This application claims priority to International Application No. PCT/FR2016/052637 filed Oct. 12, 2016; the entire contents of which is incorporated herein by reference.

BACKGROUND

This invention relates to a system for creating and providing a product, the color or texture of which is chosen by a subject, a system formed by a viewing device for showing an object from which a subject can choose said color or texture, a color or texture palette from which the subject can choose, a link to a production center for creating the product according to the subject's choice.

The invention is more particularly intended for choosing lipstick colors. Women pay great attention to this selection. This selection can be helped by using the communication means available, such as telephones, or more precisely "smart-phones". These devices are usually equipped with a photographic or video camera that enable viewing for the people who use them. On this subject, the following site can be consulted:
http//en.rimmellondon.com/?cid=en search google If it is proposed to easily choose a color, it is desired for the color to have a "personal touch" and to be unique or at least original for the person who ordered it.

One object of the present invention is to propose a system of the type mentioned in the preamble which makes it possible to create a color or a texture with some originality or uniqueness while being close to a previously chosen color.

For this purpose, such a system is remarkable in that it includes an aspect modifying device to modify the color or texture chosen by the subject.

Although an application concerning lipsticks is mainly mentioned, the invention can be applied to different aspects of make-up, more generally cosmetics, such as nails products, eye shadow, etc., Thus, thanks to the invention, a color or a texture that can be described as unique can be obtained. This can be mentioned to the subject who ordered the product by a certificate guaranteeing this uniqueness.

The invention also relates to the products obtained by means of the system, the object of the present invention.

This modification will preferably be slight to satisfy the subject's choice. The texture can also appear in another palette assigned to the choice of the glossy or matt aspect of a color.

BRIEF DESCRIPTION OF THE FIGURES

The following description, together with the drawings appended hereto, all given by way of non-limiting examples will be useful to understand how the invention may be embodied. On the drawings.

On these figures, the common elements all have the same references on all the figures.

DETAILED DESCRIPTION

Figure 1:
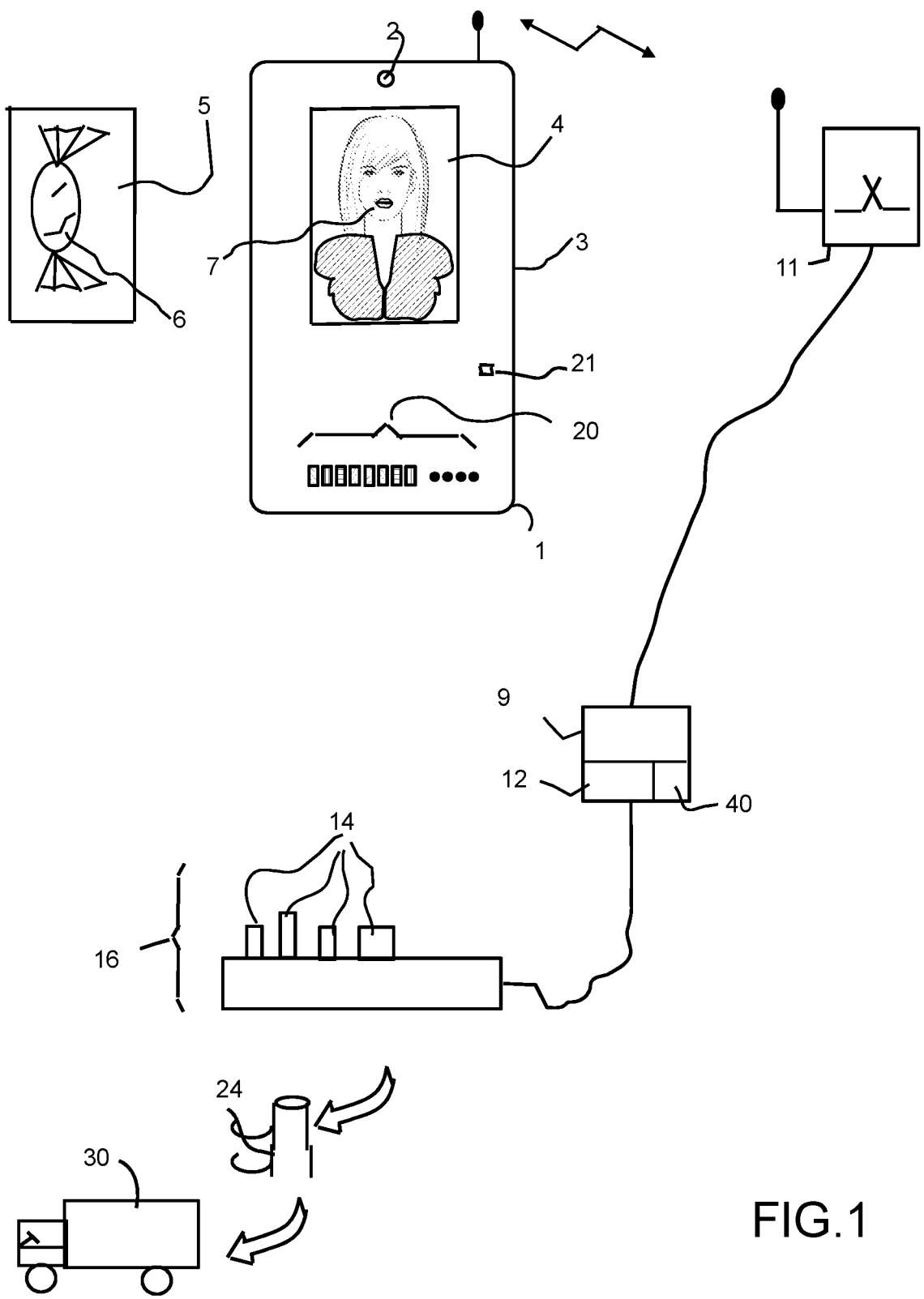
FIG. 1 shows the diagram of the system according to the invention.

In FIG. 1, the system of the invention consists of a smart-phone 1 equipped with a video camera 2.

This phone has a screen 3 on which a window 4 can appear to take a picture of a subject wishing to choose a lipstick. On this screen can also appear another window 5 showing an object 6 photographed by the subject, and from which he/she will choose the color or texture of his/her lipstick to be put on his/her lips 7. This telephone is connected to an application server 9 via the Internet network 11. The application server 9 generates controls by means of a control converter 12 which provides information for dosing the ingredients used by a production center 16. These ingredients are contained in different containers 14 belonging to the production center 16. Examples of production centers suitable for the invention can be found with "Chemspeed" company.

To choose a lipstick color or structure for his/her lips 7, the subject aims at an object 6 that is represented on the window 5. From this object, a pallet 20 is determined which is also made visible on the screen 3. The subject can thus define the lipstick color and structure which is closest to the color of the object being aimed at. By touching one zone 21 of the palette 20 the color or the texture are validated. This choice is illustrated by the appearance of the chosen color or structure on the lips 7 of his/her portrait. A second touch on the zone 21 validates the final choice of lipstick color or structure and the production of the product 24 is started almost immediately.

The palette can be in the form of a cameo of the dominant color of the object.

The product thus defined 24 can then be delivered to the subject without delay. This is illustrated in FIG. 1 by the vehicle 30.

In accordance with the invention, the invention system includes an aspect modifying device 40 to modify the color and the texture chosen by the subject.

It goes without saying that this color change must be slight so that the subject does not feel betrayed in his/her choice.

Figure 2:
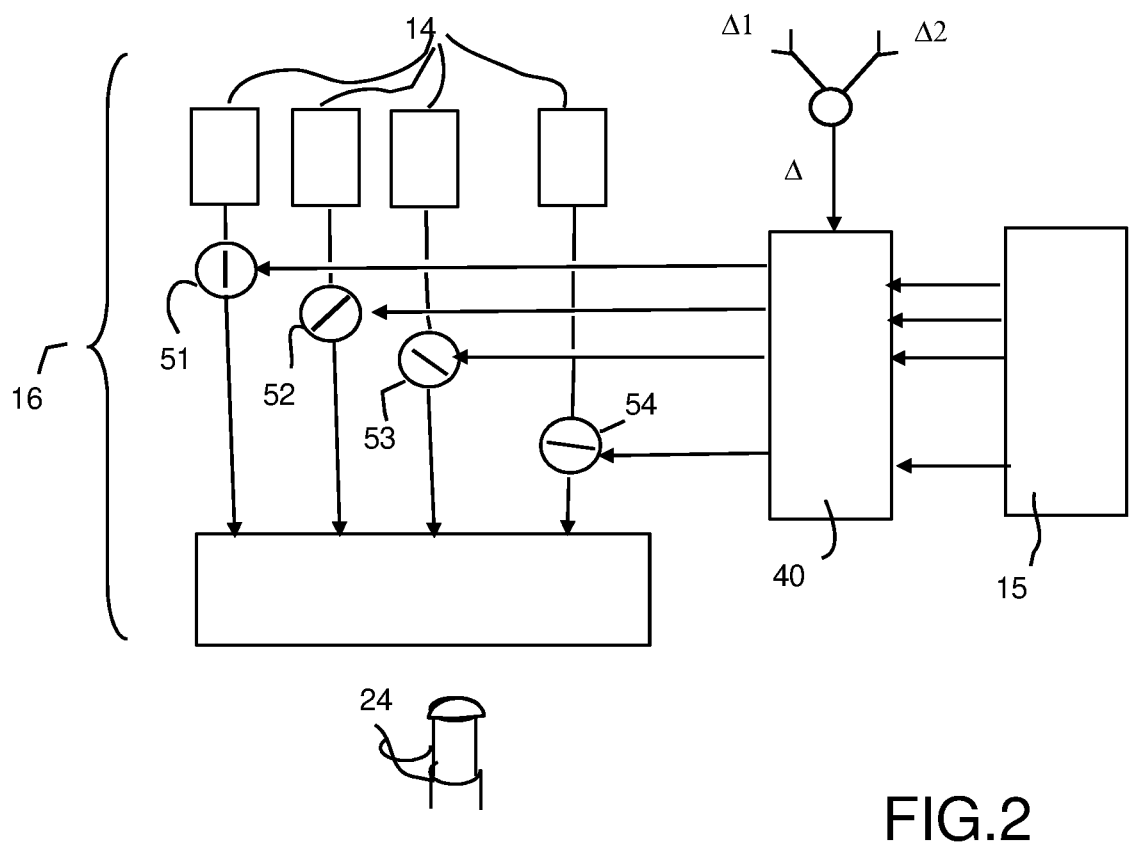
FIG. 2 shows the control of the aspect modifying device.

FIG. 2 explains how the changes are applied. Different valves 51, 52, 53, 54 regulate the flow rate of the products contained in the containers 14. The flow controls acting on these valves result from the aspect modifying device 40 which receives, on the one hand, the color controls that the subject has established and, on the other hand, modification information A.

Figure 3:
FIG. 3 shows a first mode of creation of the aspect modification.
Figure 4:
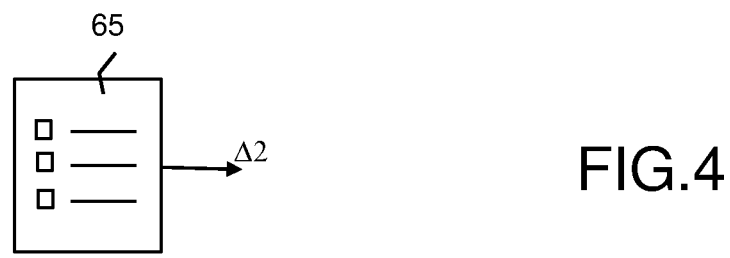
FIG. 4 shows a second mode of creation of the aspect modification.

These color changes A can be created by a random code generator 60 as shown in FIG. 3 delivering a change ΔI that can act directly on the aspect modifying device.

It is also possible, according to another alternative implementation, to make the color changes A on the basis of a questionnaire 65 sent to the subject and, depending on the answers, to deduce the value Δ2.

Of course these modification values can be combined together or act separately.

The operation of the invention system can be explained by the following steps:

Step 1—The subject uses his/her smart-phone and triggers an application dedicated to the implementation of the invention. His/her face is then photographed or filmed. He/she can choose a color by aiming at or pointing at an object having a color of interest for him/her. This object can also be one of the clothes he/she wears, or a piece of jewelry, a purse etc. From this object, a palette, preferably a cameo is derived, which is made visible on the screen. He/she can then choose the color or the structure, by touching the screen.

Step 2—Through a validation, it can be proposed to him/her a questionnaire preferably relating to his/her physical aspect (Caucasian, Asian type etc.). Upon submission, production information is sent to the production center 16 taking into account the parameters of color and structure changes AI and Δ2. The production of the product 24 is immediately started.

Step 3—Upon completion of the production, the product 24 is promptly sent to the subject who can then propose on social networks the color he/she has chosen.

The present invention also covers different variants or applications of the invention, for example, the viewing device may be inserted in a console permanently installed in a store. A colorimeter can also be used to determine the color and the structure of an object.

An important application is the reproduction of a product, the color or texture of which have already been defined by the system of the invention from an image with a color or texture from social networks already developed previously by a system conforming to the invention.

The invention claimed is:

1. A system for creating and providing a product of a certain color or texture chosen by a subject, the system comprising:
    a viewing device for showing an object from which a subject can choose the color or texture;
    a color or text palette from which the subject can choose;
    a link to a production center for creating the product according to the choice of the subject; and,
    an aspect-modifying device that slightly modifies the color or the texture chosen by the subject without further input from the subject to provide an original or unique color or texture different than but close to the color or texture chosen by the subject such that the subject does not feel betrayed in their choice
    wherein the aspect-modifying device slightly modifies the color or the texture chosen by the subject based on an input from a random generator.

2. The system according to claim 1, wherein the production of the product is started upon receipt of dosing controls from a control converter processing the data defining the color or the texture chosen by the subject.

3. The system according to claim 1, wherein the viewing device includes an image sensor.

4. The system according to claim 1, wherein the viewing device includes a colorimeter.

5. The system according to claim 1, wherein the viewing device includes a smart-phone connected to an Internet network and provided with a camera for taking pictures of the subject and the object.

6. The system according to claim 1, further comprising a console housing the viewing device.

7. The system according to claim 1, wherein the aspect-modifying device slightly modifies the color or the texture chosen by the subject based on an input deduced from answers provided by the subject to a questionnaire submitted to the subject.

8. The system according to claim 1, wherein the object is at least a portion of clothing of the subject or a portion of an environment of the subject.

9. The system according to claim 5 further comprising an application residing on the smart-phone.

10. A product obtained by the system according to claim 1.

* * * * *